Aug. 9, 1966  R. R. RUDOLPH ETAL  3,264,980
SQUEEGEE DRIVE MECHANISM

Filed Dec. 9, 1963  7 Sheets-Sheet 3

INVENTORS
ROME R. RUDOLPH,
CARL STRUTZ, Jr. and
FRANK C. STRUTZ.
BY
their ATTORNEY Aug. 9, 1966    R. R. RUDOLPH ETAL    3,264,980
SQUEEGEE DRIVE MECHANISM Filed Dec. 9, 1963    7 Sheets-Sheet 4

INVENTORS
ROME R. RUDOLPH,
CARL STRUTZ, Jr. and
FRANK C. STRUTZ.

BY their ATTORNEY

Aug. 9, 1966  R. R. RUDOLPH ETAL  3,264,980
SQUEEGEE DRIVE MECHANISM

Filed Dec. 9, 1963  7 Sheets-Sheet 6

INVENTORS
ROME R. RUDOLPH,
CARL STRUTZ, Jr. and
FRANK C. STRUTZ

BY
their ATTORNEY

United States Patent Office 3,264,980
Patented August 9, 1966

3,264,980
SQUEEGEE DRIVE MECHANISM
Rome R. Rudolph, Gibsonia, Carl Strutz, Jr., and Frank C. Strutz, Mars, Pa., assignors to Carl Strutz & Co., Inc., Valencia, Pa., a corporation of Pennsylvania
Filed Dec. 9, 1963, Ser. No. 329,129
25 Claims. (Cl. 101—40)

This invention relates to a squeegee drive mechanism, and more particularly to a squeegee drive mechanism adapted for use in decorating generally cylindrical workpieces which are simultaneously moved along a path of travel at a constant speed and rotated about their central axes at a predetermined speed.

Although not limited thereto, the present squeegee drive mechanism is particularly adapted for use with the decorating apparatus disclosed in copending application Serial No. 303,019, filed August 19, 1963 and assigned to the assignee of the present invention.

In the aforesaid copending application Serial No. 303,019, there is disclosed a decorating apparatus having an endless conveyor means adapted to support a plurality of spaced-apart generally cylindrical workpieces for rotation about their central axes. A novel drive means is described wherein the conveyor means is moved along a path of travel at a constant linear speed while the workpieces are rotated at a predetermined speed whereby the peripheral speed of the workpieces is equal to the constant linear speed of the conveyor means. As the workpieces pass beneath a stationary decorating screen, a squeegee is moved into engagement with the screen whereby the screen is displaced into line contact with the workpiece. The squeegee then is wiped across the decorating screen to transfer a decorative imprint to the workpieces. It should be understood that the squeegee is driven along the path of travel of the workpieces at a speed equal to constant linear speed of the workpieces.

The decorating apparatus described in the aforesaid copending application Serial No. 303,019, is a high speed decorating apparatus. That is to say, the workpieces travel continuously through the apparatus at a constant linear speed rather than undergoing the intermittent traveling motion normally associated with decorating apparatus. Because of its high speed operation, it is necessary that a plurality of squeegee elements, normally three or more, be used which heretofore have been chain driven around a track structure at a speed equal to the speed of the conveyor. In this manner, each of the squeegee elements is brought into decorating opposition with the stationary decorating screen at the same instant when a workpiece is positioned beneath the screen. As the workpieces continue to move, the squeegee element is wiped across the decorating screen while being moved with the workpieces. It is imperative then, that the movement of the squeegee element be timed with the movement of the workpieces.

One major disadvantage of chain driven squeegee elements is that the chain will stretch after a period of use. Any chain stretch will, of course, throw the squeegee elements out of timing with the workpieces. The only remedy is to replace the chain.

Accordingly, it is an overall object of the present invention to provide an improved squeegee drive assembly.

Other important objects of the present invention include:

To provide a squeegee drive assembly which employs only two squeegee elements for decorating continuously moving workpieces;

To provide a squeegee drive assembly wherein the position of the squeegee elements with relation to the workpieces may be quickly and easily adjusted;

To provide a squeegee drive assembly incorporating an improved drive means whereby the squeegee elements are driven in timed relation with the workpieces;

To provide a squeegee drive assembly having squeegee elements whose length of travel is substantially equal to the length of the largest design which is contemplated to be transferred to a workpiece; and To provide a squeegee drive assembly which may be adapted to decorate a generally cylindrical body portion or a conical portion of the workpieces.

According to the present invention, there is provided a squeegee drive assembly having a pair of squeegee means each mounted for reciprocal straight-line movement parallel to the path of travel of the workpieces which are to be decorated. The squeegee means also are mounted for arcuate movement transversely of the path of travel of the workpieces and about a common axis extending parallel to the path of travel of the workpieces. Novel drive means is provided for moving the squeegee means along the path of travel of the workpieces and simultaneously in opposite directions. That is to say, as one squeegee means is moved forward in the direction of travel of the workpieces, the other squeegee means is moved backward. The squeegee means are driven at the same linear speed as the workpieces and are so timed that during movement in the forward direction, a squeegee means and a workpiece are aligned and travel in unison. Thus, as each squeegee means moves in the first direction, it is actuated and deactuated to move into and out of engagement with a stationary decorating screen to apply a decorative imprint to a workpiece.

According to the preferred embodiment of the invention, each of the squeegee means is mounted for separate arcuate movement about the common axis whereby they may be displaced laterally away from the screen. Both of the squeegee means move along the same path of travel, one moving in the forward direction while the other is moving in the backward direction. Means is provided for laterally displacing that squeegee moving in the backward direction during at least a portion of its movement and for a time sufficient for it to pass the other squeegee means which is moving in the forward direction. It should be noted that in this embodiment, when one squeegee means has completed its decorating operation, the other squeegee means is in position to commence decorating the next in line workpiece. Consequently, a workpiece is being decorated substantially at all times during the operation of the present drive assembly.

According to an alternative embodiment of the present drive assembly, the squeegee means are mounted for simultaneous arcuate movement about the common axis whereby they are movable simultaneously in a lateral direction with respect to the decorating screen. Each of the squeegee means moves along its own path of travel forward and backward along a guide means. Means is provided for laterally displacing both of the squeegee means simultaneously when at their limit of travel, i.e., when one squeegee means is at the limit of its travel in a forward direction and the other squeegee means is at its limit of travel in a backward direction. Thus, when one of the squeegee means completes its decorating operation, both squeegee means are displaced or swung laterally of the screen whereby the other squeegee means is positioned perpendicular to the screen and is in readiness to commence its decorating operation.

The above and other objects and advantages of the present invention will become apparent from the following detailed description by reference to the accompanying drawings, in which.

DECORATING APPARATUS

Figure 1:
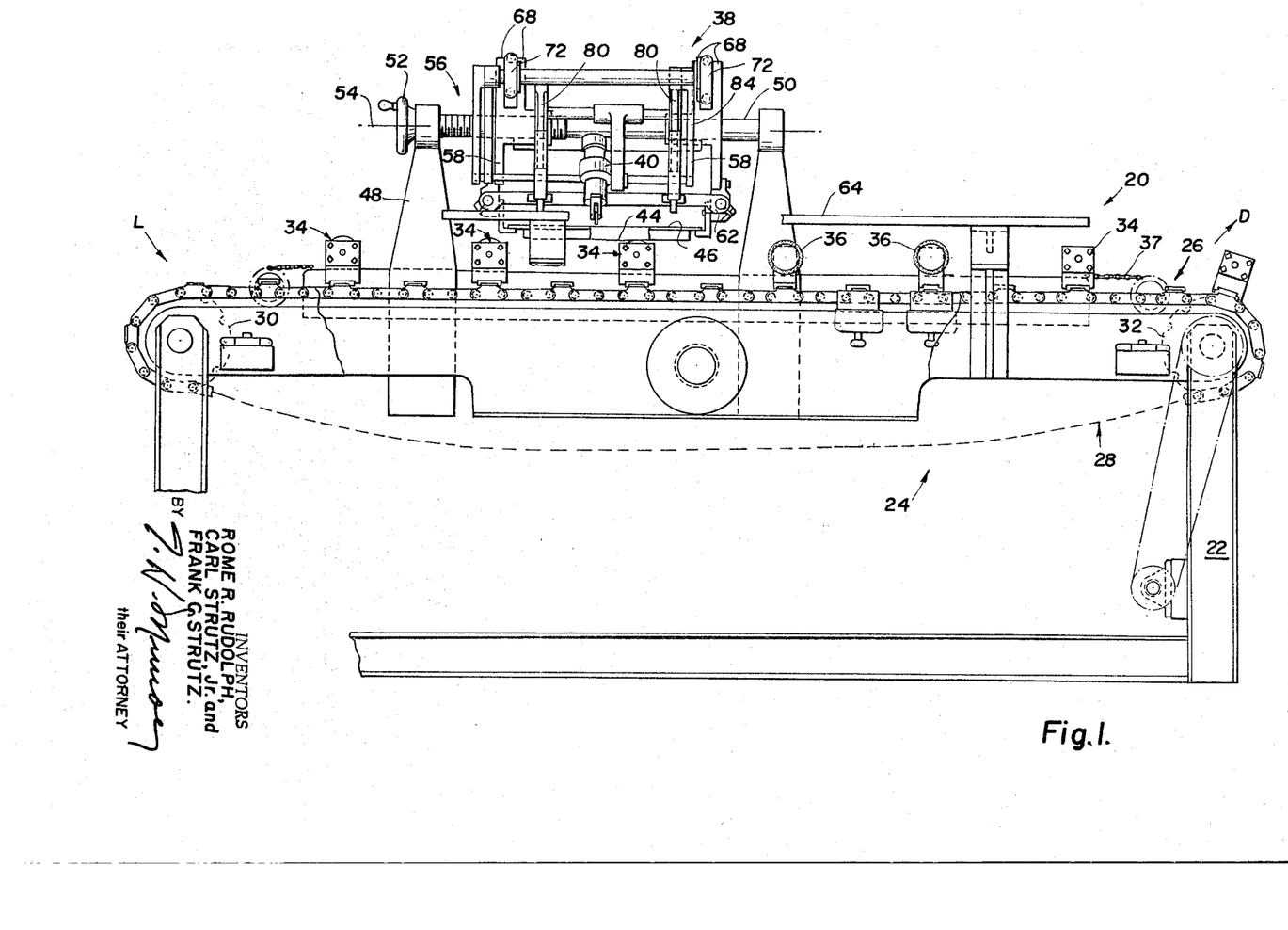
FIGURE 1 is a front view of a decorating apparatus provided with a squeegee drive assembly of the present invention.

Referring now to FIG. 1, there is illustrated a decorating apparatus 20 having a base frame 22 upon which is supported an endless conveyor means 24 having an upper reach 26 and a lower reach 28 extending between and around an idler sprocket 30 and a driven sprocket 32. The driven sprocket 32 is connected to the main drive means (not shown) of the decorating apparatus 20 whereby the conveyor means 24 is moved along a path of travel from left to right (as viewed in FIG. 1) and at a constant linear speed. Secured at spaced points along the conveyor means 24 are support mechanisms 34 which serve to support generally cylindrical workpieces 36, shown here as bottles, during their movement with the conveyor means 24. The workpieces 36 also are rotatably supported by the mechanisms 34 for rotation about their central horizontal axes.

The workpieces 36 are loaded onto the support mechanisms 34 by means of a let-down mechanism (not shown) at L, i.e., at the left end of the decorating apparatus 20; and are removed from the support mechanisms 34 by means of a take-off mechanism (not shown) at D. i.e., at the right end of the decorating apparatus 20. Each of the support mechanisms 34 includes means engaged with a drive chain 37 for rotating the workpieces 36 at a predetermined speed. The drive chain 37 may be stationary or driven in the same direction or in a backward direction with respect to the conveyor means 24 so that the peripheral speed of the workpieces 36 is equal to the constant linear speed of the conveyor.

Although not limited thereto, a complete description of the preferred construction and method of operation of suitable let-down and take-off mechanisms, as well as the method of operation and preferred construction of the conveyor means 24, the drive chain 38 and their associated drive means will be found in the aforesaid copending application Serial No. 303,019. For the purpose of the present invention, however, it will be sufficient to state that each workpiece is rotated at a predetermined speed such that its peripheral speed is equal to the constant linear speed of the conveyor means 24. Thus, each workpiece will be in rolling contact when engaged with a decorating screen which in this instance is stationary.

Positioned above the workpieces 36 is a squeegee drive assembly 38 comprising, in general, two squeegee means 40, 42 (only one visible) which are driven in a reciprocal manner and parallel to the path of travel of the workpieces 36, and a stationary decorating screen 44 attached to a screen holder 46. The stationary decorating screen 44 is positioned between the squeegee means 40, 42 and the workpieces 36.

DRIVE ASSEMBLY—GENERAL DESCRIPTION

Figure 2:
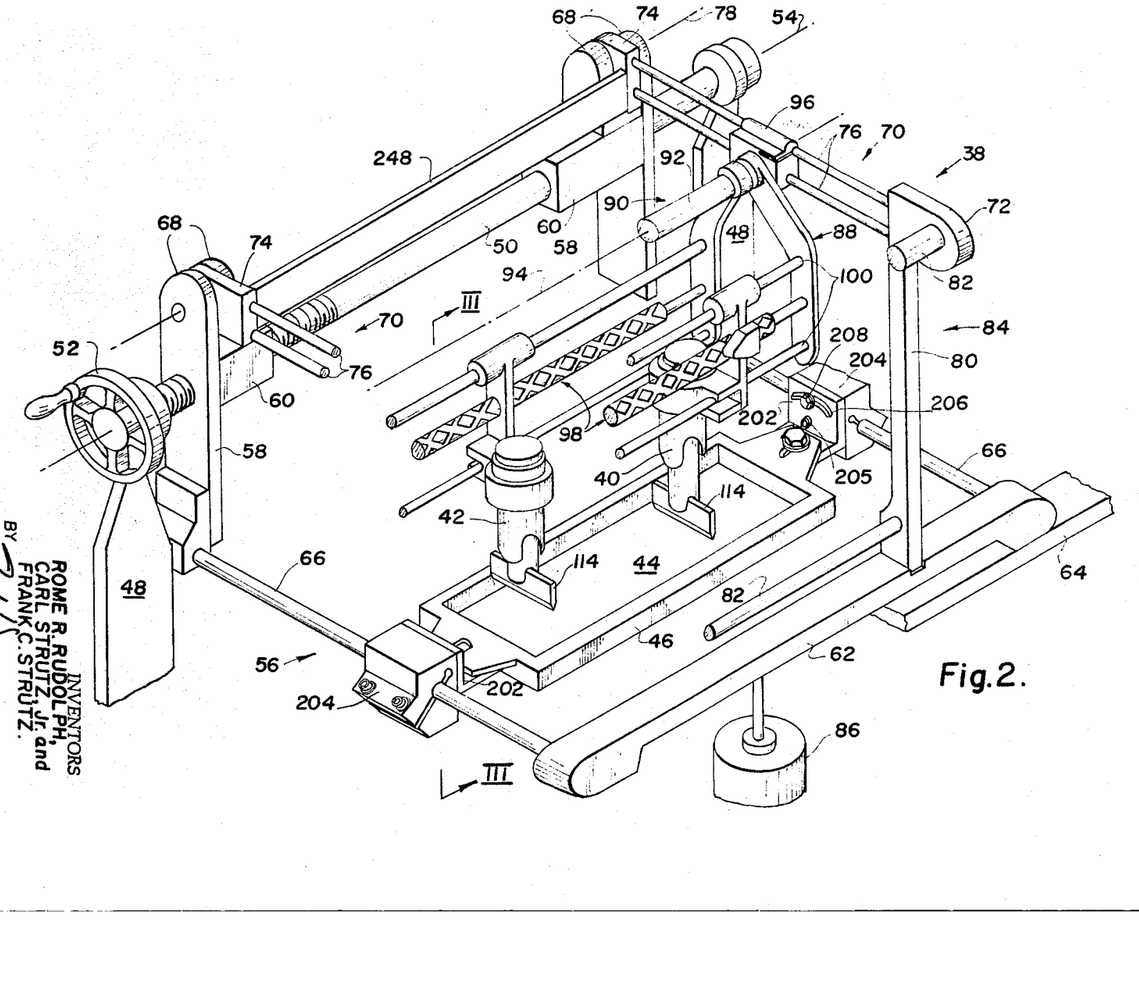
FIG. 2 is a fragmentary isometric view of the preferred embodiment of the present squeegee drive assembly.

Referring now to FIGS. 1 and 2, a pair of upstanding support arms 48 are secured to the base frame 22 and extend thereabove to support a guide bar 50 which is partially threaded. A handwheel 52 is secured to one end of the guide bar 50 for rotating the guide bar 50 about its central axis 54. A first frame 56 extends transversely over the conveyor means 24 and is supported at the back end by means of frame members 58, one of which includes an internally threaded hub 60 threadedly engaged with the threaded end of the guide bar 50. Thus, rotation of the handwheel 52 will cause movement of the first frame 56 in a direction parallel to the central axis 54 of the guide bar 50 and therefore parallel to the path of travel of the workpieces 36. A slide bar 62 rests on and is slideable over a track member 64 also secured to the base frame 22 of the decorating apparatus 20. Lower rod members 66 connect the slide bar 62 to the frame members 58.

The upper end of the frame members 58 are provided with clevis members 68. Extending horizontally from each of the clevis members 68 is a support arm 70 each formed from front and back plates 72, 74 connected together by means of a pair of rod members 76. Each of the back plates 74 is pivotally secured to the clevis members 68 whereby the arms 70 may be rotated upwardly about a pivotal axis 78. The front plates 72 each have a vertical support arm 80 extending downwardly therefrom into engagement with the slide bar 62. Connecting rod members 82 are provided, one of which extends between the front plates 72 and the other of which extends between the lower ends of the vertical support arms 80. Hence, the support arms 70, the vertical support arms 80, and the connecting rod members 82 comprise a second frame 84 which is pivotal upwardly about the pivotal axis 78 and also is movable with the first frame 56 in a direction parallel to the path of travel of the workpieces 36. Suitable clamping means (not shown) is provided for clamping the second frame 84 to the slide bar 62. Piston means 86 is provided for raising the frames 56 and 84 simultaneously at the completion of the decoration of each workpiece whereby the screen 44 is displaced above the workpiece to prevent smearing of the decorative imprint.

Figure 10:
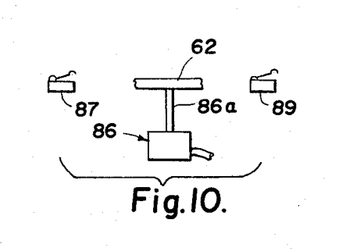
FIG. 10 is a schematic illustration of a means for elevating the screen and squeegee means of the present invention.

As can be seen by comparing FIGS. 2 and 10, the piston means 86 includes a piston rod 86a maintained in engagement with the slide bar 62 of the first frame 56. A pair of switch members 87, 89 are so positioned as to be activated by the passage of the support mechanisms 34 (see FIG. 1). Switch member 87, when actuated, causes the release of the fluid pressure in the piston means 86 so that the first and second frames 56, 84 are lowered, i.e., the slide bar 62 engages the track member 64. Simultaneously, that squeegee means disposed in a decorating position with the screen 44 is activated to lower its squeegee element 114 into engagement with the screen 44. The switch member 89 will be activated at the completion of the decoration of the workpiece. Activation of the switch member 89 will cause simultaneous actuation of the piston means 86 to raise the frames 56, 84 and deactivation of the squeegee means to raise its associated squeegee element. The raising of the screen 44 prevents the smearing of the decorative imprints just applied to the workpiece.

Secured to and between the pairs of rod members 76 are squeegee support means 88, 90 which carry the squeegee means 40, 42 respectively. The squeegee support means 88 and 90 are separately mounted on a shaft 92 for arcuate movement about its central axis 94. Hence, the squeegee support means 88, 90 are pivotal about a common axis, i.e., the central axis 94, for arcuate movement in a direction transverse to the movement of the workpieces 36. The shaft 92 is mounted on support blocks 96 (only one shown) both of which are slideably secured to the pair of rod members 76 of the support arms 70. By releasing the support blocks 96, the squeegee support means 88, 90 may be moved laterally of the path of travel of the workpieces 36.

As will be more fully described, each of the squeegee support means 88, 90 includes a squeegee drive 98 and squeegee guide rods 100. Each of the squeegee means 40, 42 thus is mounted for straight-line movement parallel to the path of travel of the workpieces 36. The squeegee drives 98 move each of the squeegee means 40, 42 reciprocably along the guide rods 100, i.e., in a first direction along with the workpieces 36 and then in a second direction which is opposite to the first direction. The squeegee drives 98 are so timed whereby one squeegee means moves in the first direction while the other squeegee means moves in the second direction. Means (not shown in FIGS. 1 and 2) is provided for transferring power to the squeegee drives 98. This means will be described in conjunction with FIGS. 5 and 6.

Figure 7:
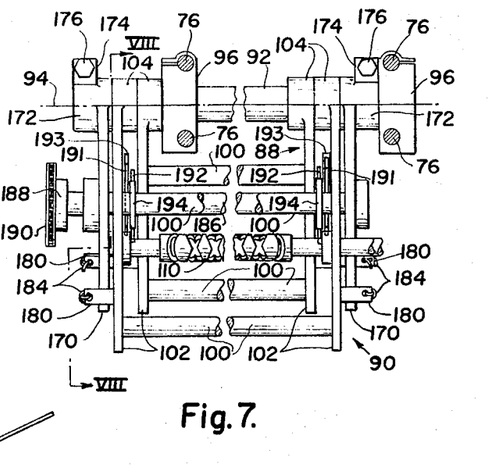
FIG. 7 is a fragmentary elevation view illustrating a preferred means for laterally displacing one of the squeegee means.
Figure 8:
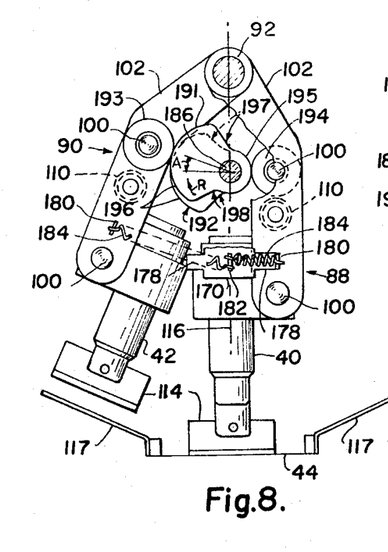
FIG. 8 is a cross-sectional view, taken along the line VIII—VIII of FIG. 7, further illustrating the preferred means for laterally displacing the other squeegee means.

It should be noted that both of the squeegee means 40, 42 are movable along the same path of travel. That is to say, they are aligned on a common path of travel. Means to be described in conjunction with FIGS. 7 and 8 is provided for laterally displacing each of the squeegee means during their movement in the second direction, i.e., while moving in a direction opposite to the travel of the workpieces 36.

SQUEEGEE SUPPORT MEANS—
PREFERRED EMBODIMENT

Figure 3:
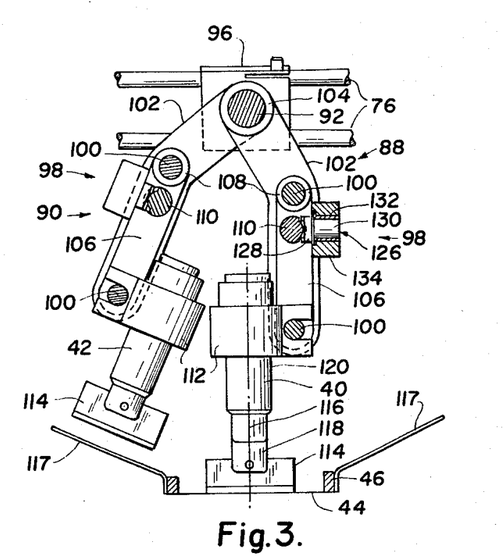
FIG. 3 is a cross-sectional view, taken along the line III—III of FIG. 2, further illustrating the squeegee drive assembly of FIG. 1.

Reference is now directed to FIGS. 2 and 3 wherein the preferred embodiment of the squeegee support means 88, 90 is illustrated. In this embodiment, each of the squeegee means 40, 42 are mounted for separate arcuate movement about a common axis. Since the squeegee support means 88 and 90 are identical in construction, only the squeegee support means 88 need be described.

As can be seen, the squeegee support means 88 comprises a pair of arcuate support arms 102 (only one visible) each having a hub 104 at the upper end which is mounted for pivotal movement about the shaft 92. The squeegee drive 98 as well as the guide rods 100 extend between and are secured to the pair of arcuate support arms 102 thereby forming an assembly which is pivotal laterally of the path of the travel of the workpieces 36. Slideably mounted on the guide rods 100 is a support bracket 106 having an elongated hub 108 at the upper end thereof which houses suitable bearing elements (not shown). Also extending through the bracket 106 is a drive shaft 110 which forms a part of the squeegee drive 98. Secured to the lower end of the support bracket 106 is a squeegee clamp member 112 within which is clamped the squeegee means 40. By releasing the clamp member 112, the squeegee means 40 may be adjusted vertically with respect to the screen 44.

It should be noted that the squeegee means 40 is in perpendicular alignment with the screen 44, i.e., it is so positioned with respect to the screen 44 that the squeegee element 114 may be moved into and out of wiping engagement with the screen 44. In FIGS. 2 and 3, the squeegee means 40 has its squeegee element 114 disposed in engagement with the screen 44 and is in the process of decorating one of the workpieces.

Normally, both of the squeegee means 40, 42 are aligned in a vertical plane indicated by the dash-dot line 116 which includes the central axis 94 of the shaft 92. Means to be described is provided for laterally displacing each of the squeegee means out of the path of the other squeegee means during its travel in the second direction. In FIG. 3, movement into the plane of the drawing corresponds to the first direction and movement out of the plane of the drawing corresponds to movement in the second direction. The squeegee means 42 is shown displaced to the left of the screen 44 into a position which will allow the squeegee means 40 to pass by. As soon as the squeegee means 40 has passed, the squeegee means 42 will be displaced inwardly into alignment with the plane 116 whereupon it completes its travel in the second direction. Thereafter, the squeegee means 42 will be moved in the first direction whereupon the squeegee means 40 will be displaced to the right of the screen 44 to permit the squeegee means 42 to pass by. As soon as the squeegee means 42 has passed by, the squeegee means 40 will be displaced inwardly into alignment with the plane 116 to complete its movement in the second direction. Drip pan elements 117 extend from the screen holder 46 and serve to prevent spotting of the workpieces passing beneath the squeegee means 40, 42 while they are displaced laterally of the screen 44.

Each of the squeegee means 40, 42 preferably comprises fluid-operated piston 118 and cylinder 120 having the squeegee element 114 secured to the end of the piston 118. A description of a squeegee means suitable for use in the present invention will be found in copending application Serial No. 262,714, filed March 4, 1963, now U.S. Patent No. 3,172,357, and assigned to the assignee of the present invention. Suitable control apparatus for actuating the cylinders 120 in timed relation with the rest of the decorating apparatus is fully described in the aforesaid U.S. Patent No. 3,172,357. However, for the purpose of the present invention, it will be sufficient to state that the cylinders 120 are actuated by the introduction of an operating fluid which causes the squeegee 114 to be displaced into engagement with the decorating screen 44. Actuation of the cylinders 120 in timed relation with the rest of the decorating apparatus is, of course, accomplished by controlling the times at which the operating fluid is introduced into the cylinders 120. The timed introduction of the operating fluid may be accomplished by means of a conventional cam operated control valve inserted into the conduit conveying the operating fluid to the cylinder 120.

SQUEEGEE DRIVE

Figure 4:
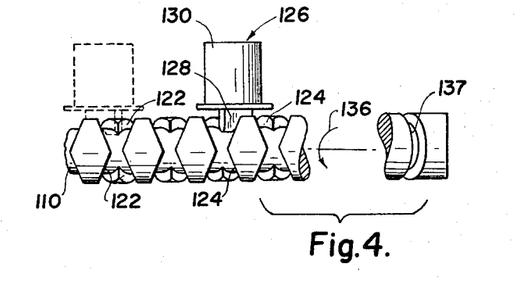
FIG. 4 is a fragmentary side view illustrating a threaded shaft and follower means employed as a squeegee drive means in the present invention.

Referring now to FIGS. 3 and 4, the squeegee drives 98 of the squeegee support means 88 and 90 are identical in construction and comprise the threaded shaft 110 which as can best be seen in FIG. 4 is provided with superimposed right- and left-hand thread means 122 and 124 respectively. A follower member 126 is provided with a projection 128 adapted to be engaged in one of the thread means 122, 124, and which extends from a cylindrical body portion 130. As can be seen in FIG. 3, the cylindrical body portion 130 is disposed within a bushing member 132 housed in a holder 134 which is secured to the support bracket 106. The follower member 126 thus is pivotally mounted in the bushing member 132.

As shown in FIG. 4, the follower member 126 illustrated in full lines has its projection engaged with the right-hand thread means 122 so that as the shaft 110 is rotated in the direction of the arrow 136, it will be moved to the right of FIG. 3. When the follower member 126 reached the end of the shaft 110, it will be pivoted in the bushing member 132 so that it will now be engaged in the left-hand thread means 124 as illustrated in dotted-outline at 126'. Rotation of the shaft 110 in the direction of the arrow 136 will cause movement of the follower member 126 to the left of FIG. 4. Hence, while the shaft 110 is rotated continuously in the direction of the arrow 136, the follower member 126 will be reciprocated back and forth along the shaft 110. Adjacent to each end of the shaft 110, the right and left hand thread means 122, 124 join to form an arcuate track portion 137 which serves to turn the follower member 126 in the bushing 132 whereby the projection 128 is lead, for example, from the right hand thread means 122 to the left hand thread means 126.

Since, the follower member 126 is connected to the holder 134 which, in turn, is secured to the support bracket 106, the squeegee means 40, for example, also will be reciprocated back and forth parallel to the shaft 110 and hence, in the first and second directions hereinabove described. It should be understood that the squeegee drive 98 associated with the squeegee support means 90 operates in the identical manner. The squeegee means 42 also is reciprocated back and forth parallel to shaft 110 and, hence, in the first and second directions hereinabove described.

In the present invention, however, the squeegee means 40, 42 are moved simultaneously in opposite directions. That is to say, that as one squeegee means moves in the first direction, the other squeegee means moves in the second direction. Further, the movement of the squeegee means 40, 42 is so timed, that each completes its movement in the appropriate direction at the same time. Thus, when one squeegee means has completed its movement in the first direction and begins to move in the second direction the other squeegee means has simultaneously completed its movement in the second direction and has begun to move in the first direction.

MAIN DRIVE ARRANGEMENT

Referring now to FIG. 2, a main drive arrangement 138 is provided which comprises three coaxial idler sprockets 140, 142 and 144 rotatably secured to the shaft 92; an idler sprocket 146 pivotally mounted on the front plate 72; a pair of idler sprockets 148 and 150 pivotally mounted on the back plate 74; hold-down idler sprockets 152, 154 secured at spaced points to the support block 96; and a pair of idler sprockets 156 and 158, one each secured to the ends of the shafts 110 of the squeegee drives 98.

A first drive chain 160 extends around the idler sprocket 148, over the sprocket 149, beneath the hold-down sprocket 152 around the idler sprocket 146 and beneath the sprocket 154. A second drive chain 162 extends between and around the idler sprockets 142 and 146 and serves to rotate the drive shaft 110 associated with the squeegee drive 88. A third drive chain 164 extends between and around the sprockets 144 and 158 and serves to rotate the shaft 110 associated with the squeegee drive 90. A fourth drive chain 166 extends between the sprocket 150 and a drive sprocket 168 which is connected to the main drive means of the decorating apparatus 20.

Hence, rotation of the drive sprocket 168 will cause the shafts 110 associated with squeegee drives 98 to rotate in the same direction thereby causing movement of the squeegee means 40, 42 reciprocally along the shafts 110 as hereinabove described.

Notice, however, that the drive arrangement 138 is such that the squeegee means 40, 42 still may be separately pivoted about the central axis 94 of the shaft 92. Hence, while being driven along the shafts 110, they still may be laterally displaced away from the screen in order to pass the oppositely traveling squeegee means. The drive arrangement 138 serves to move the squeegee means 40, 42 at the same constant linear speed at which the workpieces are traveling.

Figure 6:
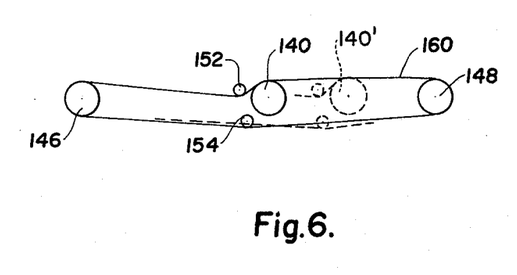
FIG. 6 is a view schematically illustrating the main drive arrangement of FIG. 5.

The purpose and placement of the hold-down sprockets 152, 154 will become apparent from an inspection of FIG. 6. As can be seen, the sprocket 152 is so positioned whereby it maintains the drive chain 160 engaged with the sprocket 140. The sprocket 154 is so positioned whereby it maintains the drive chain 160 spaced from the sprocket 140 as it passes therebeneath. Hence, an adjustment of the position of the squeegee means 40, 42 with respect to the decorating screen, may be easily accomplished by releasing the support block 96 and then moving it along the rod members 76 of the arms 70. As illustrated in FIG. 6, the sprocket 140 is shown displaced into a new position, for example, as shown in dotted lines and labeled 140'.

LATERAL DISPLACEMENT OF SQUEEGEE MEANS—PREFERRED EMBODIMENT

Reference is now directed to FIGS. 7 and 8 wherein the preferred embodiment of the means by which the squeegee means 40, 42 are displaced laterally during movement in the second direction is illustrated.

As can be seen, a pair of depending arms 170 each include a split hub 172 having lugs 174 through which extends a fastener 176 for clamping the arms 170 to the shaft 92 at any desired angular position with respect to the vertical plane 116. At the lower end of each arm 170 there are provided laterally projecting members 178 which are adapted to engage a stop 180 provided on the support arms 102 for limiting the travel thereof whereby each of the squeegee means 40, 42 will be perpendicular with the decorating screen 44. Each of the depending arms 170 is provided with a lug 182 to which is secured a pair of spring members 184, each connected to the stop members 180 of the support arms 102. The spring members 184 bias the support arms 102 and hence the squeegee means 40, 42 into alignment with the vertical plane 116.

Extending centrally of the support arms 102 and between the depending arms 170 is a shaft 186 which is rotatably mounted to the depending arms 170 by any suitable means for rotation about its longitudinal axis. At one end of the shaft 186 is mounted a sprocket 188 having a roller chain 190 engaged therewith. The roller chain 190 also is connected by suitable means to the main drive means of the decorating apparatus 20 (FIG. 1) in such a manner that the shaft 186 undergoes one revolution while each of the squeegee means 40, 42 move through the aforesaid first direction and second direction.

Secured at spaced points, to the shaft 186 are first cam discs 191 which are adapted to engage first follower members 193 rotatably mounted on the ends of the guide rods 100 associated with the squeegee support means 90; and second cam means 192 which are adapted to engage second follower members 194 rotatably mounted to the ends of the guide rods 100 associated with the squeegee support means 88. The cam discs 191, 192 are identical in shape and are rotated in a clockwise direction as indicated by the arrow labeled R. The first cam disc 191 leads the second cam disc 192 by a predetermined angle indicated at A, the arrangement being such that the squeegee means 40, 42 will be aligned in the vertical plane 116 when they are at their limit of travel in the first and second directions.

Figure 9A:
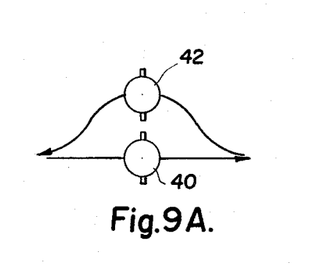
FIG. 9A and 9B are views schematically illustrating the motion of the squeegee means relative to one another when displaced by the mechanism illustrated in FIGS. 7 and 8.

As specifically illustrated in FIG. 8, the squeegee support means 90 is at its maximum lateral displacement and it, together with the squeegee support means 88, are at approximately the midpoint of their travel. This situation is illustrated in FIG. 9A. As can be seen in FIG. 8, each of the cam discs 191, 192 include a semicircular portion 195; a large arcuate lobe 196; a lead-in portion 197; and a let-down portion 198.

As the cam discs 191, 192 continue their rotation in the clockwise direction, the cam follower 193 will ride over the let-down portion of the cam disc 191 whereby the squeegee support means 90 is swung inwardly so that the squeegee means 42 is brought into alignment with the vertical plane 116. At this point in time, all of the cam followers 193 and 194 are engaged with the semicircular portions 195 of the cam discs 191, 192. On further rotation of the cam discs 191, 192, the cam follower 194 will engage the lead-in portion 197 of the cam disc 192 whereby the squeegee support means 88 is swung laterally to the right of FIG. 8. Hence, the squeegee means 40 will be displaced out of the vertical plane 116.

Figure 9B:
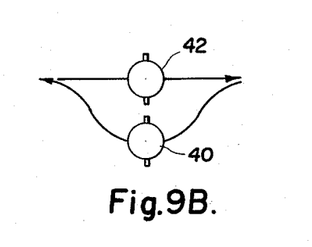

The semicircular portions 195 of the cam discs 191, 192, preferably have a circumferential length which will maintain the squeegee means 40, 42 in alignment with the vertical plane 116 during their entire length of travel in the first direction as illustrated in FIGS. 9A and 9B. Further, it is preferable that the arcuate lobes 196 of the cam discs 191, 192 be so constructed whereby the squeegee means 40, 42 are aligned with the vertical plane 116 for at least a fraction of its length of travel in at least the second direction; see FIGS. 9A and 9B.

Preferably two cam discs 191 and two cam discs 192 are provided to act on both ends of the squeegee support means 88, 90 so that no twisting of the support means 88, 90 will be encountered. Thus, the cam discs 191, 192 and the spring members 184 work in concert to effect straight-line movement of the squeegee means during movement in the first direction and to effect lateral arcuate movement of the squeegee means during movement in the second direction. It should be noted that the large arcuate lobes 196 could have a variety of different shapes just so long as the squeegee means movable thereby is displaced laterally out of the path of the other squeegee means.

DECORATION OF WORKPIECE NECK PORTION

If desired, a second squeegee drive assembly may be provided for decorating the neck portion of a workpiece. The arrangement of the decorating apparatus 20 with respect to the speed of rotation of the workpieces is fully discussed in the aforesaid copending application Serial No. 303,019.

Figures 11, 12, 13, 14A, 14B:
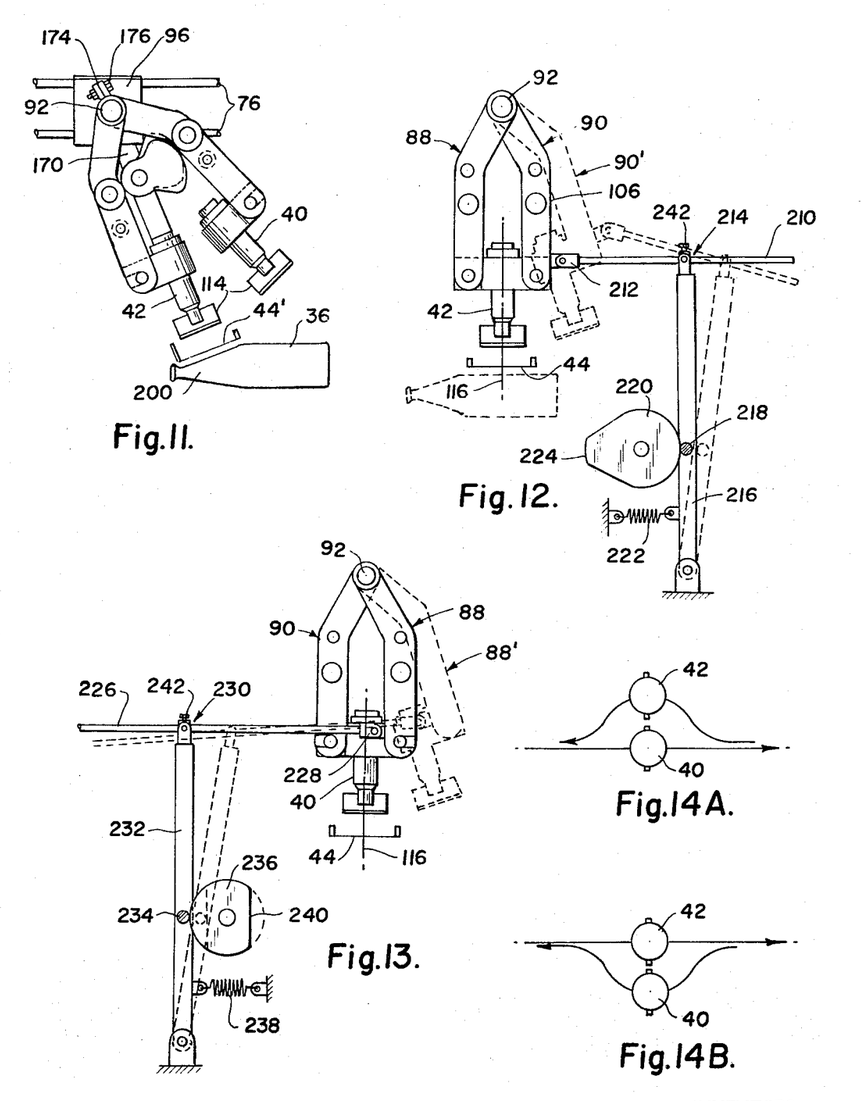
FIG. 11 is a view illustrating the squeegee means positioned to decorate the neck portion of a workpiece.
FIGS. 12 and 13 are fragmentary elevation views illustrating an alternative means for laterally displacing the squeegee means.
FIGS. 14A and 14B are views schematically illustrating the motion of the squeegee means relative to one another when displaced by the mechanisms illustrated in FIGS. 11 and 12.

In FIG. 11 there is illustrated an arrangement by which the squeegee means 40, 42 may be positioned to decorate a tapered neck portion 200 of the workpiece 36. To position the squeegee means 40, 42 in the manner illustrated in FIG. 11, the support block 96 is moved along the rod members 76 while the depending arms 170 are pivoted about the shaft 92. When the squeegee means 40, 42 are properly aligned with the screen 44', the support block 96 as well as the depending arms 170 are clamped in the new position. The operation of the squeegee drive assembly in this position is identical to its operation for decorating the cylindrical body portion of the workpiece 36.

DECORATING SCREEN SUPPORT

As can be seen in FIG. 2, an angle member 202 is secured to each end of the screen holder 46. The angle members 202, in turn, are secured to clamping blocks 204 mounted on the lower rod members 66 of the first frame 56. Loosening the clamping blocks 204 permits their movement along the lower rod members 66 so that the position of the screen 44 with respect to the body of the workpieces may be adjusted.

The screen 44 also may be tilted in order to be properly positioned for decorating the tapered neck portion of a workpiece, as will be described later in the specification. To this end the angle member 202 is pivotal about a pin 205 and includes an arcuate slot 206 having its center at the pin 205 and a fastener 208 extending through the arcuate slot 206. Hence, the fastener 208 clamps the angle member 202 to the clamping block 204 in any desired position within the range of the arcuate slot 206.

LATERAL DISPLACEMENT OF SQUEEGEE MEANS—ALTERNATIVE EMBODIMENTS

Reference is now directed to FIGS. 12 and 13 wherein an alternative embodiment of the means by which the squeegee means 40, 42 are displaced laterally during at least a portion of their movement in the second direction, is illustrated.

As can be seen in FIG. 12, a link rod 210 is pivotally connected to one of the support arms 106 of the squeegee support means 90 by means of a knuckle joint 212 and extends therefrom through and is slideable in a second knuckle joint 214 secured to pivot arm 216. Secured at an appropriate level on the pivot arm 216 is a cam follower 218 adapted to be engaged with a cam disc 220 connected by suitable means to the main drive means of the decorating apparatus 20. Spring member 222 maintains the cam follower engaged with cam disc 220 and hence, also maintains the squeegee means 42 aligned with the vertical plane 116. The cam disc 222 is for the most part circular in shape and includes a lobe 224 which when engaged with the cam follower 218 will cause movement of the squeegee support means 90 to the position illustrated in dotted outline and numbered 90'. Hence, the cam disc 220 preferably is fabricated so that the squeegee support means 90 will remain in the position illustrated in full lines for all of its movement in the first direction and for a portion of its movement in the second direction. During another portion of its movement in the second direction, the squeegee support means 90 will be displaced laterally out of the vertical plane 116. The maximum lateral displacement of the squeegee support means 90 as illustrated in FIG. 12 at 90', occurs substantially at the mid-point of its travel in the second direction.

As can be seen in FIG. 13, a link arm 226 is pivotally connected to one of the support arms 106 of the squeegee support means 88 by means of a knuckle joint 228 and extends therefrom through and is slideable in a second knuckle joint 230 secured to a pivot arm 232. Secured at an appropriate level on the pivot arm 232 is a cam follower 234 adapted to be engaged with a cam disc 236 connected by any suitable means to the main drive means of the decorating apparatus 20. A spring member 238 maintains the cam follower 234 engaged with the cam disc 236 and hence, also maintains the squeegee means 40 aligned with the vertical plane 116. The cam disc 236 is for the most part circular in shape and includes a flat 240 which when engaged with the cam follower 234 will cause movement of the support means 88 to the position illustrated in dotted outline and numbered 88'. Hence, the cam disc 236 preferably is fabricated so that the squeegee support means 88 will remain in the position illustrated in full lines during all of its movement in the first direction and for a portion of its movement in the second direction. During another portion of its movement in the second direction, the squeegee support means 88 will be displaced laterally out of the vertical plane 116. The maximum lateral displacement of the squeegee support means 88 as illustrated in FIG. 13 at 88', occurs substantially at the mid-point of its travel in the second direction.

It should be evident then that in the case of both of the cam discs 220 and 236, the squeegee means 40, 42 will undergo movement through both the first and second directions for each revolution of the cam discs 220, 236. Furthermore, the cam disc 220 will be 180° out of phase with respect to the cam disc 236. That is to say, that when the lob 224 of the cam disc 220 is engaged with the cam follower 218 as illustrated in dotted outline in FIG. 12, the cam follower 234 will be engaged with the mid-point of the circular portion of the cam disc 236.

In either case, a set screw 242 is provided in one element of the second knuckle joints 214, 230 which clamps the link rods 210, 226 in position. When the position of the squeegee means 40, 42 needs adjusting with respect to the screen 44, loosening of the set screw 242 will permit sliding of the link rods 214, 230 in either direction.

The motion of squeegee means 40, 42 during their movement in the first and second directions is schematically illustrated in FIGS. 14A and 14B. As can be seen in FIG. 14A, the squeegee means 40 is undergoing straight-line movement in the first direction which as hereinabove described is in the same direction of movement as the workpieces 36. On the other hand, the squeegee means 42 is undergoing movement in the second direction which is opposite to the first direction. At substantially the mid-point of its travel in the second direction, the squeegee means 42 will have undergone a maximum lateral displacement through the coaction of the cam disc 220 and cam follower 218 as explained above. Hence, during movement in the second direction the squeegee means 42 will undergo for the most part straight-line movement with lateral displacement at the proper time. The squeegee means 40 is thus free to pass by the squeegee means 42 to continue its decoration of a workpiece.

As can be seen in FIG. 14B, the squeegee means 42 now is undergoing straight-line movement in the first direction. On the other hand, the squeegee means 40 is undergoing movement in the second direction which is opposite to the first direction. At substantially the mid-point in its travel in the second direction, the squeegee means 40 will have undergone a maximum lateral displacement through the coaction of the cam follower 234 and the cam disc 236 as explained above. Hence, during movement in the second direction the squeegee means 40 will undergo for the most part straight-line movement with lateral displacement at the proper time. The squeegee means 42 is thus free to pass by the squeegee means 40 to continue its decoration of a workpiece.

It should be evident then, that during one complete cycle of operation, each squeegee means undergoes straight-line movement during its travel in the first direction and straight-line movement coupled with lateral displacement during its travel in the second direction. It is important to note that at the limit of their travel, the squeegee means completing movement in the second direction is always in position to decorate a workpiece. Therefore, no time is lost between decorations of the workpieces. It should be evident that the distance traveled by the squeegee means 40, 42 is at least equal to the length of the longest design contemplated to be transferred to a large diameter workpiece.

Figures 15A, 15B, 16:
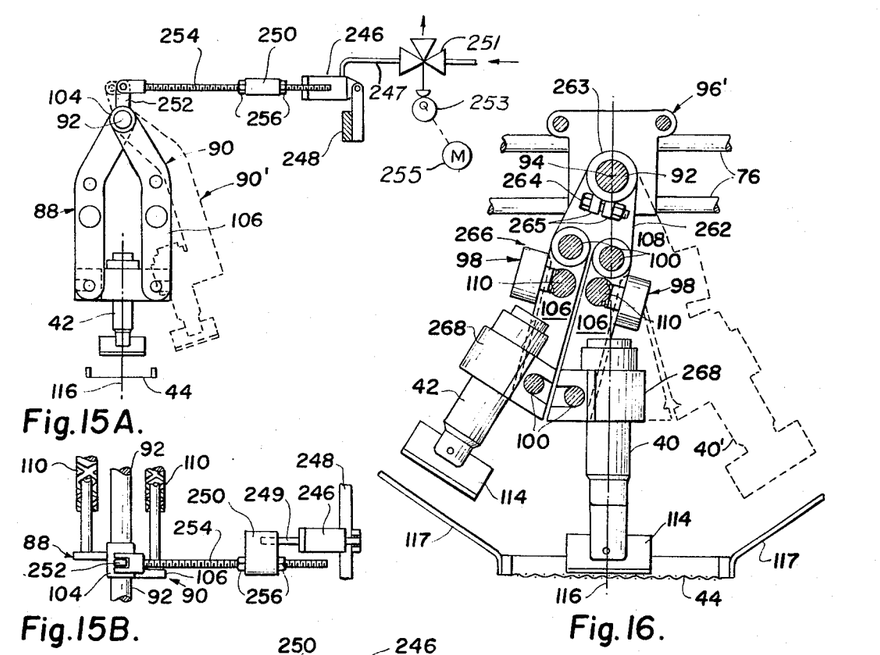
FIGS. 15A and 15B are elevation and plan views, respectively, illustrating a further alternative means for laterally displacing each of the squeegee means.
FIG. 16 is a cross-sectional view, similar to FIG. 3, illustrating an alternative embodiment of the squeegee support means.

A further alternative means for laterally displacing the squeegee support means 88, 90 is illustrated in FIGS. 15A and 15B. In this embodiment, a fluid-actuated piston means 246 is pivotally secured to a crossbar 248 extending between the back plates 74 of the support arms 70 (see FIG. 2). A piston shaft 249 (see FIG. 15B) of the piston means 246 is secured to a connecting plate 250. Extending upwardly from the hub 104 of the support bracket 106 is a lug 252 which is pivotally connected to a threaded rod 254 which extends through the connecting plate 250 and secured thereto by means of nuts 256.

The piston means 246 preferably is spring biased so as to maintain the squeegee means 42 aligned with the vertical plane 116. Upon actuation, however, the piston shaft 249 will be moved away from the piston means 246 thereby causing the squeegee means 42 to be displaced laterally out of the vertical plane 116.

Actuation of the piston means 246 in timed relation with the rest of the decorating apparatus may be accomplished by any of the well known timing methods. For example, as schematically illustrated in FIG. 15A, the piston means 246 includes a conduit 247 which conveys an operating fluid thereto. A control valve 251 is provided in the conduit 247 to control the introduction of the operating fluid into the piston means, as required. The control valve 251 is of the type which, when closed, will exhaust the operating fluid from the piston means 246 to the atmosphere. The control valve 251 is actuated in timed relation with the rest of the decorating apparatus preferably by means of an eccentric cam 253 which is driven by drive means 255 which, in turn, is operatively connected to the main drive motor of the decorating apparatus.

It should be understood that the piston means 246 is operatively connected with only the squeegee support means 90 and that a second piston means is provided for displacing the squeegee support means 88 and hence the squeegee means 40.

The lateral adjustment of the squeegee means 40, 42 with respect to the screen 44 is accomplished as described above and by loosening the nuts 256 which permits the threaded rod 254 to move through the connecting plate 250.

SQUEEGEE SUPPORT—ALTERNATIVE EMBODIMENT

In FIG. 16 there is illustrated an alternative means for supporting the squeegee means 40, 42. Corresponding numerals will be employed to identify corresponding parts already described.

In this embodiment, the squeegee means 40, 42 are mounted for simultaneous arcuate movement about the central axis 94 of the shaft 92. The parallel relationship of the guide rods 100 and shafts 110 is maintained. However, all of these elements extend between and are secured to a single pair of support arms 262 (only one visible in FIG. 12) each of which includes a split hub 263 secured pivotally to the shaft 92 by means of a fastener 264 extending through lugs 265. Thus, all of the guide rods 100, the shafts 110 of the squeegee drives 98 and the support arms 262 comprise a cradle or frame 266 which is pivotal about the central axis 94 of the shaft 92. The shaft 92 is journaled to support blocks 96'. The support blocks 96' are modified versions of the support blocks 96 as will be described.

In this instance clamp members 268 are secured to the support brackets 106 and within which are clamped the squeegee members 40, 42. As can be seen, the squeegee means 40, 42 extend radially from the shaft 92 and are angularly spaced from each other.

As in the preferred embodiment, the squeegee drives 98 reciprocate the squeegee means 40, 42 back and forth along the guide rods 100. Movement of the squeegee means 40, 42 into the plane of the drawing corresponds to the aforesaid first direction while movement of the squeegee means 40, 42 out of the plane of the drawing corresponds to the aforesaid second direction. As illustrated in FIG. 16, the squeegee means 40 is moving in the first direction with its squeegee element 114 in wiping engagement with the screen 44 while the squeegee means 42 is moving in the second direction.

Means to be described, is provided for laterally swinging the cradle 266 when the squeegee means 40, 42 are at the limit of their travel whereby the squeegee means 42 is brought into alignment with the vertical plane 116, i.e., it is positioned perpendicular to the screen 44. Simultaneously, the squeegee means 40 is swung to the right of FIG. 16 into a position indicated by the dotted outline and numbered 40'. When the squeegee means 42 completes its travel in the first direction, the squeegee means 40 will have completed its travel in the second direction whereupon the cradle 266 is swung to the left of FIG. 16 whereby the squeegee means 40 is brought into alignment with the vertical plane 116 preparatory to its traveling in the first direction.

Means also to be described, is provided for transferring power to the shafts 110 of the squeegee drives 98 to cause the reciprocal movement of the squeegee means 40, 42.

MAIN DRIVE ARRANGEMENT FOR ALTERNATIVE SQUEEGEE SUPPORT

Figure 5:
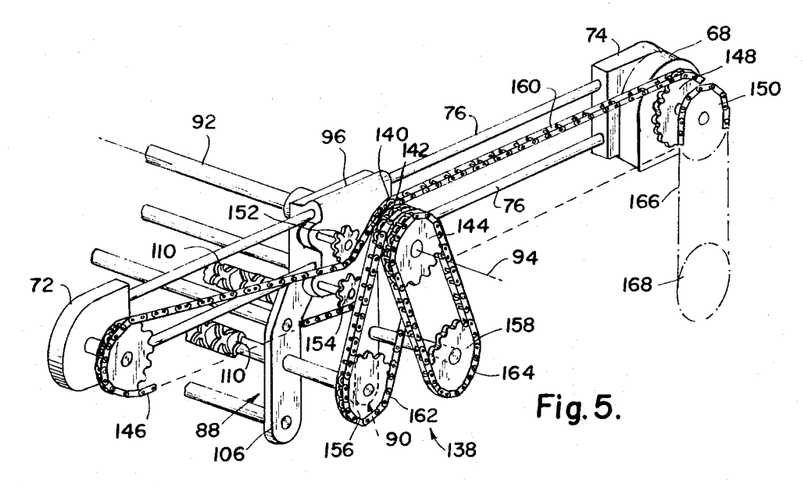
FIG. 5 is a fragmentary isometric view illustrating a main drive arrangement for rotating the shafts, one of which is illustrated in FIG. 4.
Figures 17, 23:
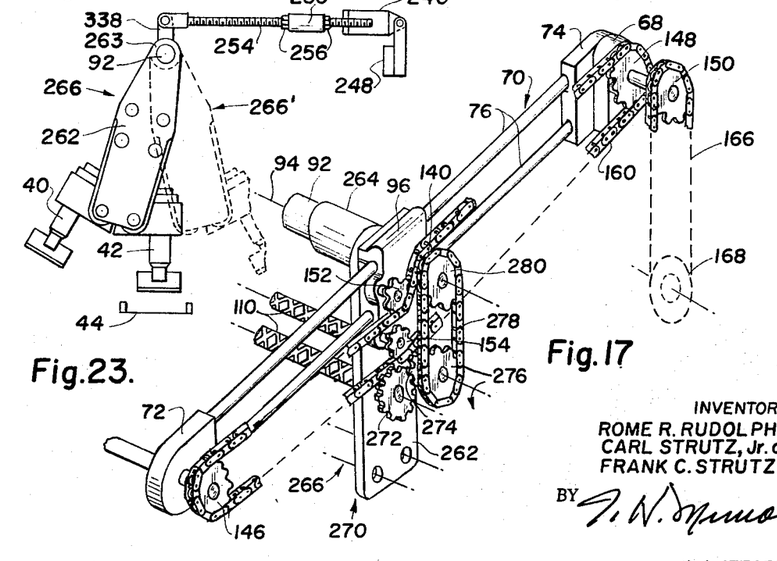
FIG. 17 is a fragmentary isometric view illustrating a main drive arrangement for rotating the squeegee drive means of the embodiment of FIG. 16.
FIG. 23 is a fragmentary elevation view illustrating an alternative means for laterally displacing the squeegee means employed in FIG. 16.

Referring now to FIG. 17, a main drive arrangement 270 for the squeegee support means of FIG. 16 is illustrated which is similar in many respects to the main drive arrangement 138 illustrated in FIGS. 5 and 6. Accordingly, corresponding numerals will be employed to identify corresponding parts already described.

The first drive chain 160 extends around the sprocket 148 pivotally mounted on the back plate 74, over the sprocket 140 pivotally mounted on the shaft 92, beneath the hold-down sprocket 152, over the sprocket 146 pivotally mounted on the front plate 72 and under the sprocket 154. The drive chain 166 extends between and around the sprocket 150 which is rotatable with the sprocket 148 and around the sprocket 168 connected by suitable means to the main drive means of the decorating apparatus 20.

Secured to the ends of the shafts 110 are gear members 272, 274 which mesh together so that when one of the gear members is rotated the other gear member will also be rotated but in the opposite direction. Also secured to one of the shafts 110 is a sprocket 276 around which extends a drive chain 278 which also extends around a sprocket 280 mounted on the shaft 92 for rotation with the sprocket 140.

Rotation of the sprocket 150 in a counterclockwise direction will cause rotation of the gear member 274 in a counterclockwise direction and rotation of the gear member 272 in a clockwise direction. Hence, the shafts 110 associated with the squeegee drives 98 also are rotated thereby causing movement of the squeegee means 40, 42 reciprocally along the shafts 110 as hereinabove described.

Notice, however, that the main drive arrangement 270 is such that the cradle 266 is still pivotal about the central axis 94 of the shaft 92. Furthermore, the drive arrangement 270 serves to move the squeegee means 40, 42 at the same constant linear speed at which the workpieces are traveling.

The purpose and arrangement of the hold-down sprockets 152, 154 is the same as in the main drive arrangement 138. That is to say, the sprocket 152 maintains the drive chain 160 engaged with the sprocket 140 while the sprocket 154 maintains the drive chain 160 spaced from the sprocket 140. Thus, lateral adjustments of the squeegee means 40, 42 with respect to the screen 44 are possible.

LATERAL SWINGING OF CRADLE 266 PREFERRED EMBODIMENT

Figure 18:
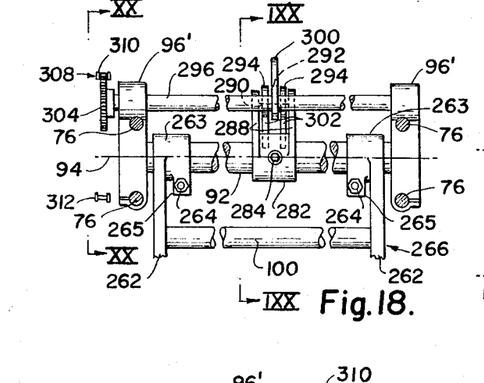
FIG. 18 is a fragmentary side view illustrating a preferred means for laterally displacing the squeegee support means of FIG. 16.
Figures 19, 22:
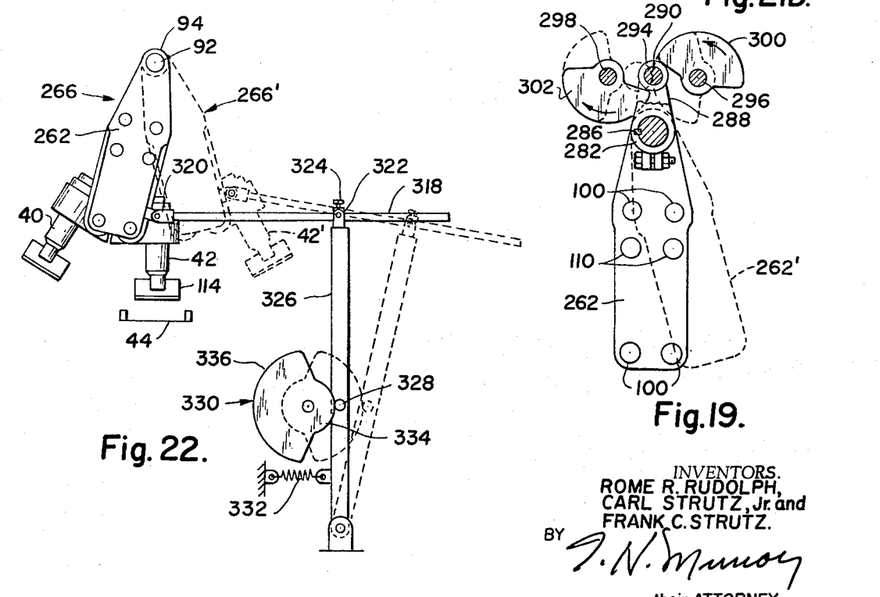
FIG. 19 is a cross-sectional view taken along the line XIX—XIX of FIG. 18.
FIG. 22 is a fragmentary elevation view illustrating a means for laterally displacing the squeegee means employed in the embodiment of FIG. 16.
Figure 20:
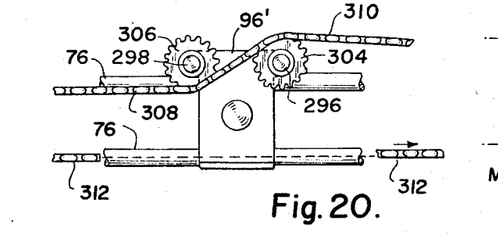
FIG. 20 is a cross-sectional view taken along the line XX—X of FIG. 18.

Reference is now directed to FIGS. 18, 19 and 20 wherein a preferred means for laterally displacing the cradle 266 is illustrated.

As can best be seen in FIGS. 18 and 19, a yoke member 282 preferably is rigidly secured at a central point on the saft 92 by any suitable means such as set screw 284 and key 286. The yoke member 282 includes a pair of arms 288 carrying a rod member 290 to which is journaled a cam follower 292 and cam followers 294 one on each side of the cam follower 290. Spaced from and parallel to the shaft 92 is a pair of cam shafts 296, 298 which are journaled in the support blocks 96' for rotation about their longitudinal axes. The cam shaft 296 has secured thereto a cam disc 300 adapted to engage the cam follower 292. The cam shaft 298 has secured thereto a pair of cam discs 302 each of which is adapted to engage one of the cam followers 294.

As best seen in FIGS. 18 and 20, sprocket members 304, 306 are secured to the projecting ends of the cam shafts 296, 298, respectively. A roller chain 308 has its upper reach 310 engaged with the upper portion of the sprocket member 304 and extends around the lower portion of the sprocket member 306. The upper reach 310 extends around other sprocket members in a manner similar to the first drive chain 160 of the main drive arrangement 270 (FIG. 17). The lower reach 312 of the roller chain 308 is spaced below the sprocket members 304, 306 as can be seen in FIG. 20.

As can be seen in FIGS. 19 and 20, this drive arrangement causes the cam disc 300 to rotate in a counterclockwise direction while the cam discs 302 rotate in a clockwise direction. Further, the position of cam disc 300 with respect to the cam discs 302 is such that the peripheral contact thereof with the cam followers 292 and 294 will cause the cradle 266 to be displaced laterally to the right of FIG. 19 as shown in dotted outline at 262' and then laterally to the left of FIG. 19. In essence, the peripheries of the cam discs 300 and 302 comprise a cam track which moves the cam followers 292, 294 to swing the cradle 262 about the axis 94 of the shaft 92.

For the alternative embodiment of FIG. 16, the motion of the squeegee means 40, 42 during movement in the first and second directions is schematically illustrated in FIGS. 21A, 21B, 21C and 21D.

Figures 21A, 21B:
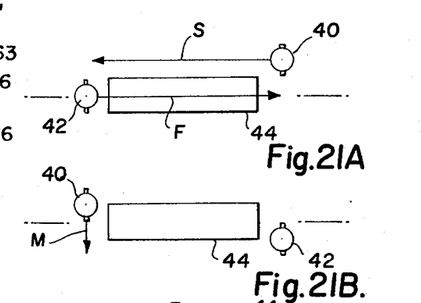
FIGS. 21A, 21B, 21C and 21D are views schematically illustrating the movement of the squeegee means employed in the embodiment of FIG. 16.

In FIG. 21A, the squeegee means 42 is in perpendicular alignment with the screen 44 preparatory to movement in the first direction, indicated by the arrow F, for the decoration of a workpiece. The squeegee means 40, on the other hand, is spaced from the screen 44 prepartory to movement in the second direction indicated by the arrow S.

Upon completion of their travel in the first and second directions, the squeegee means 40, 42 are moved laterally of the screen 44 in the direction indicated by the arrow M in FIG. 21B.

Figure 21C:
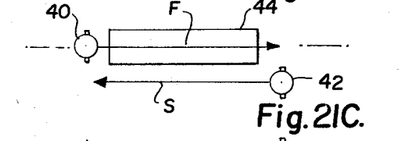
Figure 21D:
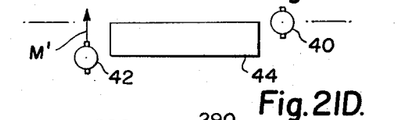

Upon completion of their lateral movement, as shown in FIG. 21C, the squeegee means 40 is in perpendicular alignment with the screen 44 preparatory to moving in the first direction, arrow F, for decorating a workpiece. The squeegee means 42, on the other hand, is spaced from the screen 44 preparatory to movement in the second direction, arrow S.

Upon completion of their movement in the first and second directions, the squeegee means 40, 42 are moved laterally of the screen 44, in the direction indicated by the arrow M' in FIG. 21D, once again to be positioned as illustrated in FIG. 15A. In this embodiment, the length of travel of the squeegee means 40, 42 is slightly greater than the length of the longest design contemplated to be transferred, since a certain amount of time is necessary to displace the squeegee means laterally once each half cycle.

When it is desired to decorate the tapered neck portion of a workpiece, as in FIG. 11, when employing the alternative squeege support means of FIG. 16 and means of FIGS. 18, 19 and 20 for laterally displacing the squeegee means 40, 42, it is a simple task to loosen the support blocks 96' to move the cradle 266 to the desired position wherein it is secured in place. Thereafter the fasteners 264 which clamp the support arms 262 to the shaft 92 are loosened. The cradle 266 then may be pivoted about the shaft 92 until one of the squeegee means 40, 42 is perpendicular to the decorating screen. The fasteners 264 then are tightened whereby the cradle 266 is secured in its sloped position.

*Lateral swinging of squeegee means alternative embodiments*

Referring now to FIG. 22, there is illustrated an alternative means for swinging the cradle 266 laterally of the path of travel of the workpieces whereby each of the squeegee means 40, 42 is alternately brought into perpendicular alignment with the decorating screen 44. As can be seen, a link rod 318 is pivotally secured at one end to the support arm 262 by means of a knuckle joint 320. The link rod 318 extends through and is slideable in a second knuckle joint 322. A set screw 324 secures the link rod 318 to the second knuckle joint 322 at a predetermined position. The second knuckle joint 322 is secured to the upper end of a pivot arm 326. Secured at an appropriate level on the pivot arm 326 is a cam follower 328 which is engaged with a cam disc 330 suitably connected to the main drive means of the decorating apparatus 20. A spring member 332 maintains the cam follower 328 engaged with the cam disc 330.

One cycle of operation consists of, for example, the squeegee means 40 undergoing movement in the first direction and then in the second direction while simultaneously the squeegee means 42 undergoes movement in the second direction and then in the first direction. When the squeegee means 40 completes its movement in the first direction it must be displaced laterally away from the screen 44 and when it completes its movement in the second direction it must be displaced toward and into perpendicular alignment with the screen 44. Thus, lateral displacement occurs twice during each cycle of operation of the squeegee means 40, 42. Accordingly, the cam disc 330 is provided with a small radius lobe 334 covering approximately one-half of the circumference of cam disc 330 and a large radius lobe 336 covering approximately the other one-half of the circumference of the cam disc 330. When the small radius lobe 334 is engaged with the cam follower 328, the squeegee means 42 is in perpendicular alignment with the screen 44 preparatory to moving in the first direction. When the large radius lobe 336 is engaged with the cam follower 328, the cradle 266 has been displaced to the right of FIG. 22 into the position indicated in dotted outline at 266' whereby the squeegee means 40 is in perpendicular alignment with the screen 44 preparatory to moving in the first direction. It should be evident then that the cam disc 330 is rotated through 360° for each cycle of operation of the squeegee means 40, 42.

In this embodiment, only one cam follower 328 and one cam disc 330 are required since on movement of the cradle 266, both squeegee means 40, 42 are moved.

Referring to FIG. 23, there is illustrated a further alternative means for laterally swinging the squeegee means 40, 42 once during each half cycle of operation. This embodiment is identical with the embodiment illustrated in FIGS. 15A and 15B. Accordingly, corresponding numerals will be employed to identify corresponding parts already described.

In this instance the threaded rod 254 is secured to a lug 338 extending from the hub 263 of the support arm 262. The threaded rod 254 extends through the connecting plate 250 and is secured thereto by means of the nuts 256. The fluid-actuated piston means 246 is pivotally secured to the crossbar 248 and also is secured to connecting plate 250. The piston means 246 preferably is spring loaded whereby the squeegee means 42 is in perpendicular alignment with the screen 44. Upon actuation of the piston means 246, however, the cradle 266 is swung into the position shown in dotted outline at 266' whereby the squeegee means 40 is positioned in perpendicular alignment with the screen 44.

Although the invention has been illustrated in connection with certain specific embodiments, it will be readily apparent to those skilled in the art that certain changes of form and arrangement of parts to suit requirements may be made without departing from the spirit and scope of the invention.

We claim as our invention:

1. A squeegee drive assembly comprising in combination a pair of squeegee means; guide means supporting each of said squeegee means for reciprocal movement generally parallel to a stationary decorating screen and through a distance substantially equal to the length of said screen; means supporting each of said guide means for movement laterally of said screen; drive means for reciprocating said pair of squeegee means along said guide means, through said distance and in opposite directions relative to one another; means for moving each of said squeegee means into engagement with said screen during movement in a first direction; and means for moving each of said squeegee means laterally away from said decorating screen during at least a portion of its movement in a second direction opposite to said first direction.

2. A squeegee drive assembly comprising in combination: a pair of squeegee means; guide means supporting each of said squeegee means for separate reciprocal movement generally parallel to a stationary decorating screen; means supporting each of said guide means for movement laterally of said screen; drive means for reciprocating said pair of squeegee means along said guide means and in opposite directions relative to one another, said drive means comprising a shaft for each said squeegee means including superimposed right and left-hand thread means, follower members, one each connected to each squeegee means and engaged in one of said thread means, and means for rotating said shafts to cause simultaneous movement of one of said squeegee means in a first direction and the other of said squeegee means in a second direction opposite to said first direction and vice versa; means for moving each of said squeegee means into engagement with said screen during movement in said first direction; and means for moving each of said squeegee means laterally away from said screen during at least a portion of the movement in said second direction.

3. The combination of claim 2 wherein said shafts are maintained in fixed spaced parallel relation with each other, and said means for rotating said shafts comprises a gear mounted on each shaft and meshing with the gear on the other shaft and means for driving one of said gears whereby said shafts rotate in opposite direction.

4. The combination of claim 2 wherein said shafts are maintained in spaced parallel relation with each other and are separately movable laterally of said decorating screen, said means for rotating said shafts comprising a gear secured to each of said shafts and single means for driving both of said gears whereby said shafts rotate in the same direction.

5. The combination of claim 1 wherein each of said squeegee means comprises a fluid-operated piston means having a squeegee element secured to the end thereof.

6. A squeegee drive assembly comprising in combination: a pair of squeegee means mounted for pivotal movement about a common axis extending parallel to a stationary decorating screen; guide means supporting each of said squeegee means for reciprocal movement generally parallel to said common axis; drive means for reciprocating said pair of squeegee means along said guide means and in opposite directions relative to one another; means for moving each of said squeegee means into engagement with said screen during movement in a first direction; and means for pivoting each of said squeegee means about said common axis laterally away from said screen during at least a portion of its movement in a second direction opposite to said first direction.

7. A squeegee drive assembly comprising in combination: a pair of squeegee means mounted for individual arcuate movement about a common axis extending parallel to a stationary decorating screen; guide means supporting each of said squeegee means for reciprocal movement generally parallel to said common axis; drive means for reciprocating each of said squeegee means along said guide means whereby one squeegee means is moved in a first direction while the other squeegee means is moved in a second direction opposite to said first direction and vice versa; both of said squeegee means normally being disposed perpendicular to and directly opposite from said screen; means for moving each of said squeegee means into engagement with said screen during movement in said first direction; and means for swinging each of said squeegee means laterally out of the path of the other squeegee means during movement in said second direction.

8. A squeegee drive assembly comprising in combination: a pair of squeegee means mounted for individual arcuate movement about a common axis extending parallel to a stationary decorating screen; guide means supporting each of said squeegee means for reciprocal movement generally parallel to said common axis; drive means for reciprocating each of said squeegee means along said guide means whereby one squeegee means is moved in a first direction while the other squeegee means is moved in a second direction opposite to said first direction and vice versa; both of said squeegee means normally being disposed perpendicular to and directly opposite from said screen; means for moving each of said squeegee means into engagement with said screen during movement in said first direction; and separate cam means for each of said squeegee means and operable to swing each of said squeegee means laterally out of the path of the other squeegee means during movement in said second direction.

9. A squeegee drive assembly comprising in combination: a pair of squeegee means mounted for individual arcuate movement about a common axis extending parallel to a stationary decorating screen; guide means supporting each of said squeegee means for reciprocal movement generally parallel to said common axis; drive means for reciprocating each of said squeegee means along said guide means whereby one squeegee means is moved in a first direction while the other squeegee means is moved in a second direction opposite to said first direction and vice versa; both said squeegee means normally being disposed perpendicular to and directly opposite from said screen; means for moving each of said squeegee means into engagement with said screen during movement in said first direction; and separate fluid-actuated piston and cylinder means for each said squeegee means and operable to swing each of said squeegee means laterally out of the path of the other squeegee means during movement in said second direction.

10. A squeegee drive assembly comprising in combination: a pair of squeegee means mounted for individual arcuate movement about a common axis extending parallel to a stationary decorating screen; guide means supporting each of said squeegee means for reciprocal movement along a common path parallel to said common axis and said screen; drive means for reciprocating each of said squeegee means along said guide means whereby one squeegee means is moved in a first direction along said common path while the other squeegee means is moved in a second direction opposite to said first direction and also along said common path; both of said squeegee means normally being disposed perpendicular to and directly opposite from said screen; means for moving each of said squeegee means into engagement with said screen during movement in said first direction; and means for swinging each of said squeegee means laterally out of said common path during movement in said second direction for a time sufficient to pass the other squeegee means which is traveling in said first direction.

11. A squeegee drive assembly comprising in combination: a pair of cradle means mounted for separate pivotal movement about a common axis extending parallel to a stationary decorating screen; rod means mounted on each of said cradle means and extending parallel to said common axis; squeegee means mounted on each of said rod means for reciprocal movement thereon and for individual arcuate movement with said cradle means about said common axis, both of said squeegee means undergoing movement along a common path parallel to said screen; drive means for reciprocating each of said squeegee means along said rod means whereby one squeegee means is moved in a first direction along said common path while the other of said squeegee means is moved in a second direction opposite to said first direction and also along said common path; both of said squeegee means normally being positioned perpendicular with and directly opposite from said screen; means for moving each of said squeegee means into engagement with said screen during movement in said first direction; and means for swinging each of said cradle means separately about said common axis to move each of said squeegee means laterally out of said common path during a portion of its movement in said second direction for a time sufficient to pass the other squeegee means which is traveling in said first direction.

12. A squeegee drive assembly comprising in combination: a pair of squeegee means mounted for simultaneous pivotal movement about a common axis extending parallel to a stationary decorating screen; guide means supporting each of said squeegee means for reciprocal movement parallel to said common axis; drive means for reciprocating each of said squeegee means along said guide means whereby one squeegee means is moved in a first direction while the other squeegee means is moved in a second direction opposite to said first direction and vice versa; means for moving each of said squeegee means into engagement with said screen during movement in said first direction; and means for swinging both of said squeegee means about said common axis when at the limit of travel thereof whereby the squeegee means completing movement in said second direction is positioned perpendicularly to said screen while the other of said squeegee means is spaced laterally from said screen.

13. A squeegee drive assembly comprising in combination: a pair of squeegee means mounted for simultaneous pivotal movement about a common axis extending parallel to a stationary decorating screen; guide means supporting each of said squeegee means for reciprocal movement parallel to said common axis; drive means for reciprocating each of said squeegee means along said guide means whereby one squeegee means is moved in a first direction while the other squeegee means is moved in a second direction opposite to said first direction and vice versa; means for moving each of said squeegee means into engagement with said screen during movement in said first direction; and single cam actuated means operable to swing both of said squeegee means about said common axis when at the limit of travel thereof whereby the squeegee means completing movement in said second direction is positioned perpendicularly to said screen while the other of said squeegee means is spaced laterally from said screen.

14. A squeegee drive assembly comprising in combination: a pair of squeegee means mounted for simultaneous pivotal movement about a common axis extending parallel to a stationary decorating screen; guide means supporting each of said squeegee means for reciprocal movement parallel to said common axis; drive means for reciprocating each of said squeegee means along said guide means whereby one squeegee means is moved in a first direction while the other squeegee means is moved in a second direction opposite to said first direction and vice versa; means for moving each of said squeegee means into engagement with said screen during movement in said first direction; and single fluid actuated piston and cylinder means operable to swing both of said squeegee means about said common axis when at the limit of travel thereof whereby the squeegee means completing movement in said second direction is positioned perpendicularly to said screen while the other of said squeegee means is spaced laterally from said screen.

15. A squeegee drive assembly comprising in combination: a pair of squeegee means mounted for simultaneous pivotal movement about a common axis extending parallel to a stationary decorating screen, said squeegee means extending radially from said common axis and being angularly spaced from one another; guide means supporting each of said squeegee means for reciprocal movement parallel to said common axis; drive means for reciprocating each of said squeegee means along said guide means whereby one squeegee means is moved in a first direction while the other squeegee means is moved in a second direction opposite to said first direction and vice versa; means for moving each of said squeegee means into engagement with said screen during movement in said first direction; and means for swinging both of said squeegee means about said common axis when at the limit of travel thereof whereby the squeegee means completing movement in said second direction is positioned perpendicularly to said screen while the other of said squeegee means is spaced laterally from said screen.

16. A squeegee drive assembly comprising in combination: cradle means supported for pivotal movement about an axis extending parallel to a stationary decorating screen; first and second rod means mounted on said cradle means and extending parallel to said axis; squeegee means mounted on each of said rod means for reciprocal movement thereon, said squeegee means extending radially from said axis and being angularly spaced; drive means for reciprocating each of said squeegee means along said rod means whereby one squeegee means is moved in a first direction while the other squeegee means is moved in a second direction opposite to said first direction and vice versa; means for moving each of said squeegee means into engagement with said screen during movement in said first direction; and means for swinging said cradle means about said axis when said squeegee means are at their limit of travel on said rod means whereby the squeegee means completing movement in said second direction is displaced toward and into perpendicular alignment with said screen while the other of said squeegee means is displaced laterally away from said screen.

17. In apparatus for applying decorative imprints to generally cylindrical workpieces, having endless conveyor means adapted to support said workpieces at spaced points thereon for rotation about their central axes, means for driving said conveyor means along a path of travel at a constant linear speed and parallel to a stationary decorating screen, and means for rotating said workpieces at a predetermined speed whereby the peripheral speed of the workpieces is equal to said constant linear speed, the combination comprising: a pair of squeegee means; guide means supporting said squeegee means for reciprocal movement generally parallel to said path of travel and through a distance substantially equal to the length of said screen; means supporting said guide means for movement laterally of said path of travel; drive means for reciprocating said pair of squeegee means along said path of travel, at said constant linear speed whereby one squeegee means is moved in a first direction along said path of travel and in unison with a workpiece while the other squeegee means is moved in a second direction opposite to said first direction and vice versa; means for moving each of said squeegee means into engagement with said screen during movement in said first direction; and means for moving each of said squeegee means laterally away from said decorating screen during at least a portion of its movement in said second direction.

18. In apparatus for applying decorative imprints to generally cylindrical workpieces, having endless conveyor means adapted to support said workpieces at spaced points thereon for rotation about their central axes, means for driving said conveyor means along a path of travel at a constant linear speed and parallel to a stationary decorating screen, and means for rotating said workpieces at a predetermined speed whereby the peripheral speed of said workpieces is equal to said constant linear speed, the combination comprising: a pair of squeegee means; guide means supporting each of said squeegee means for reciprocal movement generally parallel to said path of travel; means supporting said guide means for movement laterally of said path of travel; drive means for reciprocating said pair of squeegee means along said path of travel, at said constant linear speed whereby one squeegee means is moved in a first direction along said path of travel and in unison with a workpiece while the other squeegee means is moved in a second direction opposite to said first direction and vice versa, said drive means comprising a shaft for each said squeegee means including superimposed right- and left-hand thread means, follower members, one each connected to each of said squeegee means and engaged in one of said thread means, and means for rotating said shafts to cause simultaneous movement of one of said squeegee means in said first direction and the other of said squeegee means in said second direction and vice versa; means for moving each of said squeegee means into engagement with said screen during movement in said first direction; and means for moving each of said squeegee means laterally away from said decorating screen during at least a portion of its movement in said second direction.

19. The combination of claim 17 wherein each of said squeegee means comprises a fluid-operated piston means having a squeegee element secured to the end thereof.

20. In apparatus for applying decorative imprints to generally cylindrical workpieces, having endless conveyor means adapted to support said workpieces at spaced points thereon and for rotation about their central axes, means for driving said conveyor means along a path of travel at a constant linear speed and parallel to a stationary decorating screen, and means for rotating said workpieces at a predetermined speed whereby the peripheral speed of said workpieces is equal to said constant linear speed, the combination comprising: a pair of squeegee means; guide means supporting said squeegee means for reciprocal movement generally parallel to said decorating screen through a distance substantially equal to the length of said screen; means supporting said guide means for separate arcuate movement about a common axis extending parallel to said path of travel; drive means for reciprocating said pair of squeegee means along said path of travel, at said constant linear speed whereby one squeegee means is moved in a first direction along said path of travel and in unison with a workpiece while the other squeegee means is moved in a second direction opposite to said first direction and vice versa; means for moving each of said squeegee means into engagement with said screen during movement in said first direction; and means for moving each of said squeegee means laterally away from said screen during at least a portion of its movement in said second direction.

21. In apparatus for applying decorative imprints to generally cylindrical workpieces, having endless conveyor means adapted to support said workpieces at spaced points thereon and for rotation about their central axes, means for driving said conveyor means along a path of travel at a constant linear speed and parallel to a stationary decorating screen, and means for rotating said workpieces at a predetermined speed whereby the peripheral speed of said workpieces is equal to said constant linear speed, the combination comprising: a pair of squeegee means mounted for simultaneous arcuate movement about a common axis extending parallel to said path of travel; guide means supporting said squeegee means for reciprocal movement parallel to said common axis; drive means for reciprocating said pair of squeegee means along said guide means, at said constant linear speed whereby one squeegee means is moved in a first direction along said path of travel and in unison with a workpiece while the other squeegee means is moved in a second direction opposite to said first direction and vice versa; means for moving each of said squeegee means into engagement with said screen during movement in said first direction; and means for swinging both of said squeegee means about said common axis when at the limit of travel thereof whereby the squeegee means completing movement in said second direction is positioned perpendicular to said screen while the other squeegee means is spaced laterally from said screen.

22. A squeegee drive assembly comprising in combination: first squeegee support means; at least one squeegee means mounted on said first squeegee support means for reciprocal straight-line movement parallel to a stationary decorating screen; second squeegee support means; at least one squeegee means mounted on said second squeegee support means for reciprocal movement generally parallel to said stationary decorating screen and to the movement of the squeegee means on said first squeegee support means; a drive means mounted on each of said squeegee support means for reciprocating said pair of squeegee means along said guide means; one of said squeegee means being moved in a first direction while the other of said squeegees is moved in a second direction opposite to said first direction and vice versa; means for moving each of said squeegee means into engagement with said screen during movement in a first direction; and means for moving each of said squeegee means laterally away from said screen during at least a portion of its movement in a second direction opposite to said first direction.

23. The combination of claim 22 wherein both of said squeegee means are disposed perpendicular to and directly opposite the screen whereby they move along a common path of travel during at least a portion of their travel in said first and second directions.

24. The combination of claim 23 wherein said means for moving each of said squeegee means laterally away from said screen comprises: cam means mounted for rotation about a cam axis extending centrally between said first and second squeegee support means; cam follower means mounted on each of said first and second squeegee support means and adapted to engage said cam means; means for rotating said cam means about said cam axis; each of said cam means including a lobe adapted to swing alternately one of said squeegee support means and then the other of said squeegee support means laterally away from said screen during movement in said second direction; each of said lobes having a predetermined circumferential length whereby each of said squeegee means travels along said common path for at least a portion of its travel in said second direction; and means for biasing said squeegee means into alignment with said common path.

25. A squeegee drive assembly comprising in combination: cradle means mounted for pivotal movement about a common axis extending parallel to a stationary decorating screen; first and second spaced-apart guide means mounted on said cradle; at least one squeegee means mounted on each of said guide means for reciprocal movement parallel to said common axis; drive means for reciprocating each of said squeegee means along said guide means whereby one squeegee means is moved in a first direction while the other of said squeegee means is moved in a second direction opposite to said first direction; means for moving each of said squeegee means into engagement with said screen during movement in said first direction; and means for swinging said cradle means laterally of said screen first in one direction and then in the opposite direction whereby each of said squeegee means is brought into perpendicular alignment with said screen during movement in said first direction while the other of said squeegee means is displaced laterally of said screen during movement in said second direction, said last-mention means comprising: spaced-apart cam means mounted for rotation about separate axes extending parallel to said common axis; cam follower means connected to said cradle means and disposed between said cam means and in point contact therewith; and means for rotating said cam means in opposite directions whereby said cam follower is caused to undergo oscillatory movement to effect movement of said cradle laterally of said screen.

References Cited by the Examiner

UNITED STATES PATENTS

| | | | |
|---|---|---|---|
| 2,027,102 | 1/1936 | Hommel et al. | 101—123 |
| 2,039,909 | 5/1936 | Kem et al. | 101—123 |
| 2,121,491 | 6/1938 | Soubier | 101—123 |
| 2,267,596 | 12/1941 | Montague et al. | 101—123 |
| 2,793,586 | 1/1954 | Arelt | 101—123 |

DAVID KLEIN, *Primary Examiner.*

ROBERT E. PULFREY, *Examiner.*

NATHANIEL A. HUMPHRIES, *Assistant Examiner.*